Figure 1:
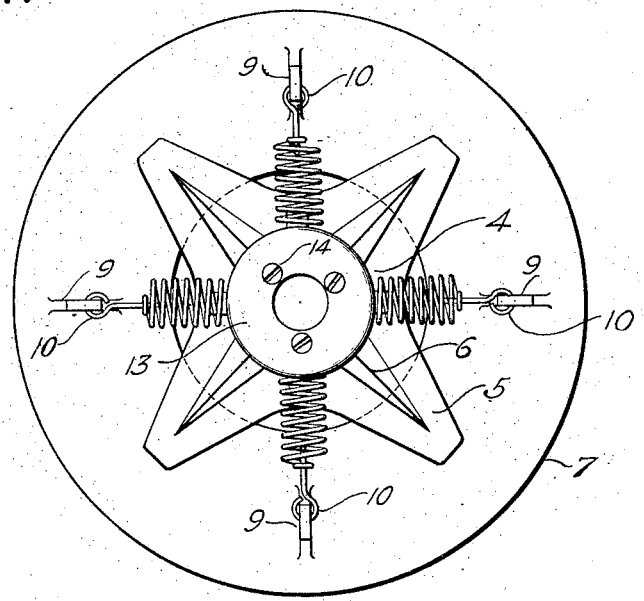

E. P. HINCHBERGER.
TROLLEY.
APPLICATION FILED JUNE 17, 1911.

1,016,747.

Patented Feb. 6, 1912.

WITNESSES:
J. R. Mahaney
K. H. Buller

INVENTOR.
E. P. HINCHBERGER
BY
H. C. Evert & Co.
ATTORNEYS

COLUMBIA PLANOGRAPH CO., WASHINGTON, D. C.

UNITED STATES PATENT OFFICE.

EDWARD P. HINCHBERGER, OF PITTSBURGH, PENNSYLVANIA, ASSIGNOR OF ONE-THIRD TO SARAH HINCHBERGER, OF PITTSBURGH, PENNSYLVANIA.

TROLLEY.

1,016,747.   Specification of Letters Patent.   Patented Feb. 6, 1912.

Application filed June 17, 1911. Serial No. 633,665.

*To all whom it may concern:*

Be it known that I, EDWARD P. HINCHBERGER, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and the objects of my invention are to provide a trolley harp with yieldable guard plates that will recede when bridge rails, frogs or other over-head construction is encountered, and to provide guard plates that will be normally maintained in position to prevent accidental displacement of a trolley wheel relatively to a trolley wire, rail or electric conductor.

Further objects of my invention are to provide yieldable guard plates that can be easily applied to the present type of trolley harp, and to accomplish the above results by a mechanical construction that is inexpensive to manufacture, free from injury by ordinary use and efficient for the purposes for which it is intended.

These and such objects as may hereinafter appear are attained by the novel construction, combination and arrangement of parts to be hereinafter specifically described and then claimed.

Reference will now be had to the drawing, wherein:—

Figure 2:
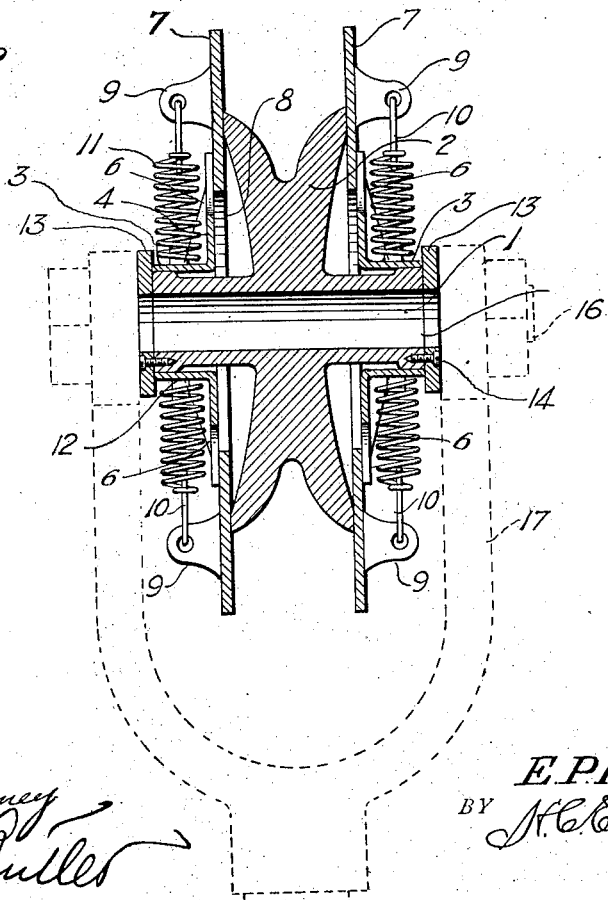

Figure 1 is a side elevation of the trolley wheel in accordance with this invention, and Fig. 2 is a vertical sectional view of the same showing the harp by dotted lines.

The reference numeral 1 denotes the tubular hub of a grooved trolley wheel 2 and loosely mounted upon said hub are the sleeves 3 of pressure members 4, said members having radially disposed arms 5 reinforced by a radially disposed rib 6, the members 4 are adapted to engage the outer sides of circular guard plates 7 having large central openings 8 providing clearance for the hub 1 of the wheel 2. The plates 7 are of a greater diameter than the wheel 2 whereby the edges of said plates will project above the periphery of the trolley wheel 2. The outer sides of the guard plates 7 are provided wth a plurality of apertured lugs 9 and connected to said lugs by links 10 are the outer convolutions of coiled springs 11 having the inner convolutions thereof mounted over stud pins 12 carried by the sleeves 3.

The pressure members 4 normally hold the guard plates 7 in engagement with the sides of the trolley wheel 2, and to retain the sleeves 3 of said pressure members upon the hub 1, the ends of the hub are provided with circular heads 13 secured in position by set screws or other fastening means 14. The heads 13 have central openings 15 alining with the bore of the hub 1. The hub 1 is adapted to receive the spindle or journal-pin 16 of a harp 17, it being preferable to mount the pin in the harp 17 whereby the wheel 2 can revolve upon said pin.

From the foregoing it will be observed that the pressure members normally retain the guard plates in engagement with the wheel 2 and that the openings 8 of said plates allow said plates to recede when over-head constructions are encountered by said plates. Under ordinary circumstances the plates 7 provide a groove of considerable depth for the trolley wire, consequently the liability of the trolley wheel being displaced, due to high speed and trolley wire irregularities, is reduced to a minimum.

The invention is not limited to the size or material used in the construction of the improvement, and other changes can be made without departing from the scope of the appended claims.

What I claim is:—

1. In a trolley, the combination with a trolley wheel having a hub, of pressure members arranged upon said hub, circular guard plates arranged between said members and said wheel, apertured lugs carried by the outer sides of said guard plates, and springs interposed between said members said lugs, substantially as described.

2. In a trolley, the combination with a trolley wheel having a hub, of pressure members arranged upon said hub, circular guard plates arranged between said members and said wheel, apertured lugs carried by the outer sides of said guard plates, springs interposed between said members and said lugs, and heads secured to the ends of the hub of said wheel and adapted to retain said pressure members thereon.

3. In a trolley, the combination with a trolley wheel having a hub, of pressure members arranged upon the ends of the hub of said wheel, radially disposed arms carried by said members, circular guard plates encircling the hub of said wheel and retained in engagement with the sides of said wheel by said members and the arms thereof, apertured lugs carried by the outer sides of said guard plates, springs interposed between said members and said lugs, and means including heads adapted to retain said members upon the ends of the hub of said wheel, substantially as described.

In testimony whereof I affix my signature in the presence of two witness.

EDWARD P. HINCHBERGER.

Witnesses:
SARAH HINCHBERGER,
MAX H. SROLOVITZ.

Copies of this patent may be obtained for five cents each, by addressing the "Commissioner of Patents, Washington, D. C."